Feb. 23, 1932.   P. W. DIETMANN   1,846,994
CARRIER BAR FOR MATCH MAKING MACHINES
Filed April 4, 1930
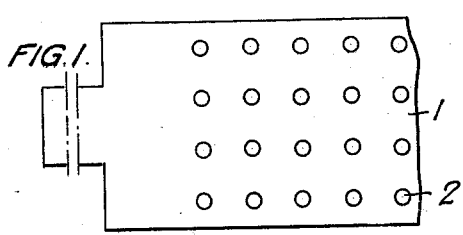
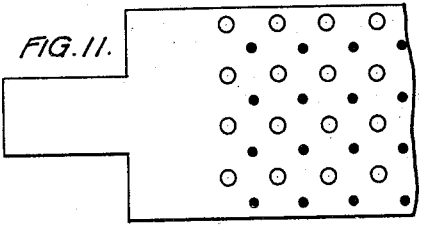
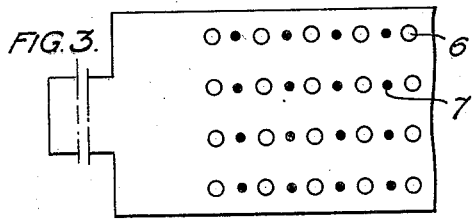
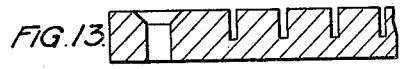
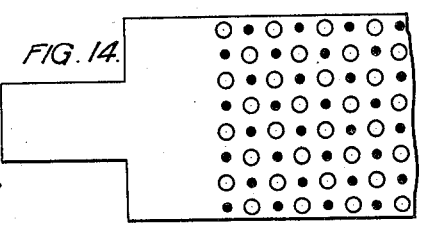
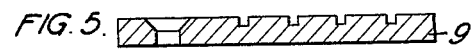
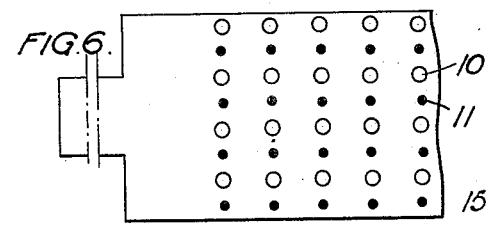
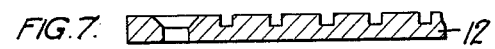
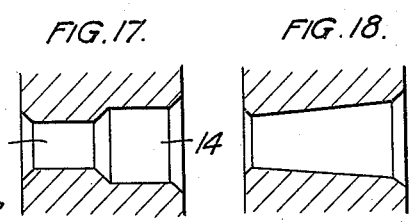
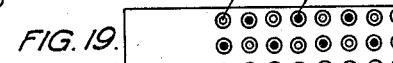
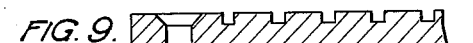
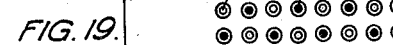
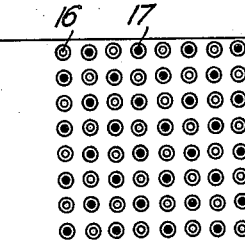
Inventor,
Paul W. Dietmann,
By Henry Orth Jr
Atty.

Patented Feb. 23, 1932

1,846,994

UNITED STATES PATENT OFFICE

PAUL WILHELM DIETMANN, OF JONKOPING, SWEDEN

CARRIER BAR FOR MATCH MAKING MACHINES

Application filed April 4, 1930, Serial No. 441,578, and in Sweden May 6, 1929.

The present invention relates to match making machines in which the splints are put into perforations in carrier-bars by which they are conveyed through the machine to be impregnated with paraffine, have heads put on, and dried. The carrier-bars which usually form an endless series guided along its edges may either be free of each other or hinged to each other to form an endless chain. The matches, when finished, are ejected from the carrier-bars by means of a reciprocating needle-beam.

Heretofore, it has only been possible to use each machine of the above said type for the manufacture of matches the thickness of which lies within comparatively narrow limits determined by the diameter of said perforations. A factory for manufacturing matches of several different sizes must, therefore, as a rule, be equipped with a plurality of machines some of which have their carrier-bars bored to receive thicker matches, whereas the carrier-bars of other machines are perforated to receive thinner matches. This, however, presents the drawback that machines designed, for instance, for the manufacture of thinner matches must be put out of operation at times due to an incidental reduction of the orders for such matches, whereas the machines for manufacturing thicker matches cannot, perhaps, at the same time effect a temporary increase in the production of such matches.

It is true that proposals have been made to modify this drawback by having for each machine an additional chain of carrier-bars or an additional set of such bars and by effecting exchange of carrier-bars when required. This, however, will not only result in an increased first cost but will also result in great loss of time in effecting the exchange of the bars. It has further been proposed to make the perforations in the bars larger than is required to receive the thickest matches to be dealt with, and to insert a spring in each perforation to maintain the matches in engagement with the perforations. It has been found however, that these springs may easily be damaged by the needle beam by which the matches are ejected and owing to ignition now and then occurring in such machines the springs will be annealed so that they cannot at last hold the matches in place with safety or will break.

The present invention has for its object to provide a carrier-bar which may be used in manufacturing matches of different cross section and which does not suffer from the disadvantage above mentioned. The invention is characterized, chiefly, by the fact that the perforations of the carrier-bar are adapted to receive matches of different thickness by forming the perforations, apart from any possible countersinking, of different cross section in respect of individual perforations or in respect of various portions of one and the same perforation.

The invention is illustrated in the accompanying drawings in which, Figure 1 is a plan view of part of a carrier-bar presenting the well-known single boring as hitherto commonly used. Fig. 2 is a section of the corresponding part of an inserting plate or grate. Figs. 3 to 5, 6 to 10, 11 to 13, and 14 to 16 illustrate in the similar way four different embodiments of the invention in which the bars are formed with perforations of different diameters. Fig. 17 is a longitudinal section to an enlarged scale of a double perforation, and Fig. 18 is a longitudinal section to an enlarged scale of a conical perforation. Fig. 19 is a plan view of part of a bar formed with two series of double perforations or conical perforations.

The well-known carrier-bar 1 shown in Fig. 1 is provided with four rows of perforations 2, all of the same diameter. For the insertion of the splints into the perforations of such a bar a horizontally reciprocating plate or grate (Fig. 2) is used which is connected at 4 to a movable support and formed with a number of notches 5 corresponding to the number of perforations 2 of one horizontal row. By well-known means matches may be caused to drop from a container into the notches in order in the movement of the grate to be inserted in that row of perforations 2 which is at the time right in front of the notches. On the next insertion of matches the bar has been moved downwards a distance corresponding to the vertical pitch of perforations so that the next row of perforations can be filled. The bars, after having been filled with matches in the manner above described, are conveyed further to impregnate the matches with paraffine, have heads put thereon, and dry the matches which are then ejected by means of a reciprocating needle beam situated behind the bars.

In the embodiment shown in Figs. 3–5 the bar is formed with perforations of different diameters. The perforations 6 are of such a diameter as to be suited to receive thicker matches, whereas the perforations 7 are of a smaller diameter, that is, adapted to receive thinner matches. In this embodiment the perforations 6 and 7 are situated alternately in each horizontal row so that in changing from the production of thicker matches to the production of thinner matches a certain adjustment must take place so as to cause the smaller perforations to coincide with the notches of the grate used. As the bars must be exactly guided laterally at their ends said adjustment may be effected by displacing the guides laterally (as to the left) a distance equal to the distance between two adjacent perforations 6, 7 of one and the same horizontal row. In this case the same grate 8 may be used for both kinds of matches. The adjustment, however, may also be effected by displacing the grate 8 a corresponding distance in which case likewise one grate only is required. Yet, it is still better, especially in case of the smallest size, to replace the grate 8 by another grate 9 having staggered notches which are, moreover, of a smaller width and will, as a result, effect a more reliable guiding of the matches during the insertion thereof so as to prevent them from becoming bent or breaking.

According to Figs. 6 to 10 rows of smaller perforations 11 are provided between the rows of wider perforations 10. The adjustment may in this case be effected solely by adjusting the feeding device of the bars while maintaining the grate 12 in place. In order to secure a more positive guiding of the thin matches the grate 12 may be replaced by yet another grate 13 having perforations of reduced width. Should it be desired in any case to change grates when effecting the adjustment, the grates may preferably be of the designs shown in Figs. 9 and 10, that is to say, so that there will be a difference in depth between the wider notches, Fig. 9, and the narrower notches, Fig. 10, corresponding to the distance between two adjacent perforations 10, 11 of one and the same vertical row, whereby any adjustment of the feeding device need not take place in this case in connection with the change of grates.

The arrangement of the perforations as illustrated in Fig. 11, that is, with the smaller perforations constituting separate rows, both horizontally and vertically, between the horizontal and vertical rows of wider perforations, respectively, presents the advantage over the embodiments above described that it permits a reduction of the pitch of perforations without falling below the minimum distance between the perforations as shown in Figs. 3 and 6. The bar may, as a result, be made narrower or formed with more perforations, whereby a sufficient drying time may be obtained with a reduced length of the carrier-bar chain. Should it not be desired to displace the feeding and the lateral guiding of the bars the grates may be designed as shown in Figs. 12 and 13.

In the embodiments shown one row of perforations only can, as a rule, be filled with matches at each insertion. It is, however, already known per se to fill two rows of staggered perforations at each insertion. In such case the grate must be formed with alternately shallow and deep notches. Even to such machines the present invention may be applied, and Figs. 14 to 16 show one example of such application. Wider and smaller perforations are in this case arranged in the bar alternately with each other both in the horizontal and the vertical rows, as will appear from Fig. 14. With the grate designed as shown in Fig. 15 two adjacent rows of wider perforations may be filled at each insertion. Adjustment for the purpose of manufacturing thinner matches may be effected by adjusting the lateral guides of the bars or by replacing the grate shown in Fig. 15 by the grate shown in Fig. 16.

In the embodiments of the invention above described two sets of perforations of different diameters are formed in the carrier-bar. It is evident, however, that also three or more sets may be provided, if very thick and very thin matches should be manufactured in one and the same machine.

Instead of varying the size of the cross section of the individual perforations with respect to each other the size of the cross section may be varied within each individual perforation. Fig. 17 shows a longitudinal section of a perforation to an enlarged scale produced by two coaxial borings 14 and 15 of different diameters each of which extends through about half the thickness of the bar to form what may be termed a double perforation. The insertion movement of the grate may be so adjusted that in the manufacture of thicker matches such matches will only enter the boring 14 of the perforations, whereas in the manufacture of thinner matches such matches will also engage the boring 15. In fact, however, provision must always be made to effect such an adjustment of the movement of the grate even in connection with bars having single borings, as one and the same machine must be capable of manufacturing matches of the same thickness, but of varying length, whereby it is considered unnecessary to describe more fully each adjustment in this connection. Each individual perforation may, of course, be composed of more than two cylindrical borings; in such case, however, it will, no doubt, be better to let the perforations continuously decrease in diameter, as, for instance, by making them conical over their entire length, as shown in Fig. 18. The bars may, furthermore, be provided with double perforations or conical perforations in which case either all perforations may be of one and the same size, or two sets of perforations of different width may be used. Fig. 19 shows an example of such an arrangement. The set of perforations 16 may be designed as shown in Fig. 17 or 18 to receive comparatively thick matches, whereas the set of perforations 17 are adapted to receive rather thin matches. With the use of the grates shown in Figs. 15 and 16 two rows of perforations may in this case be filled at each insertion stroke.

It is to be noted that in a universal match making machine having carrier-bars of a design according to this invention it is also possible simultaneously to produce matches of different thickness. To this end, one part of the bar may be filled with matches of one size and the other part of the bar with matches of the other size, provided the grate is composed of two parts of appropriate cross sections.

What I claim is:—

1. A carrier bar of the type having rows of perforations to carry and convey splints in match making machines; in which one set of perforations of a given diameter is arranged alternately with one set of perforations of a different diameter, to allow the same bar to be used in manufacturing matches of different size.

2. A carrier bar of the type set forth having rows of perforations to carry and convey splints in match making machines; in which perforations of two different sizes are arranged alternately in one and the same row.

3. A carrier bar of the type set forth having rows of perforations to receive splints in match making machines and in which each such perforation is of gradually or continuously varying diameter, characterized in that two sets of such perforations of different size are arranged alternately with one another in the same rows, both in the longitudinal and the transverse direction of the bar.

In testimony whereof I have signed my name.

PAUL WILHELM DIETMANN.